(12) United States Patent
Ishibashi et al.

(10) Patent No.: US 12,122,469 B2
(45) Date of Patent: Oct. 22, 2024

(54) UTILITY VEHICLE

(71) Applicant: KAWASAKI JUKOGYO KABUSHIKI KAISHA, Hyogo (JP)

(72) Inventors: Kazuki Ishibashi, Kobe (JP); Kazumasa Hisada, Kobe (JP); Yoshiyuki Kuroyanagi, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 62 days.

(21) Appl. No.: 17/371,829

(22) Filed: Jul. 9, 2021

(65) Prior Publication Data
US 2023/0007887 A1   Jan. 12, 2023

(51) Int. Cl.
*B62D 9/00* (2006.01)
*B62D 15/02* (2006.01)

(52) U.S. Cl.
CPC ........... *B62D 9/002* (2013.01); *B62D 15/021* (2013.01)

(58) Field of Classification Search
CPC ..... B62D 9/002; B62D 15/021; B60T 8/1769; B60K 23/0808
See application file for complete search history.

(56) References Cited

U.S. PATENT DOCUMENTS

| | | | | |
|---|---|---|---|---|
| 5,301,768 | A | * | 4/1994 | Ishikawa ............... B60T 8/1769 180/197 |
| 2006/0285342 | A1 | * | 12/2006 | Mizuno .................... B60Q 1/12 362/465 |
| 2008/0262670 | A1 | * | 10/2008 | McClellan ............ G01S 5/0027 701/31.4 |
| 2009/0000839 | A1 | * | 1/2009 | Ishii ........................ B62D 11/04 701/41 |
| 2009/0248268 | A1 | * | 10/2009 | Shigeta .............. B60K 23/0808 701/72 |
| 2014/0103627 | A1 | | 4/2014 | Deckard et al. | 
| 2017/0088142 | A1 | * | 3/2017 | Hunt ..................... B60W 30/08 |

* cited by examiner

*Primary Examiner* — Andrew J Cromer
(74) *Attorney, Agent, or Firm* — Wenderoth, Lind & Ponack, L.L.P.

(57) ABSTRACT

A utility vehicle includes a pair of left and right wheels; a drive source that drives the wheels; and a control device capable of individually controlling rotational speeds of the wheels, wherein in a case where the control device determines that a predetermined tight turn execution condition has been satisfied, the control device executes tight turn control for controlling the wheels so that a rotational speed of an outer wheel becomes relatively higher than a rotational speed of an inner wheel in a turning direction of the utility vehicle.

18 Claims, 6 Drawing Sheets

UTILITY VEHICLE

BACKGROUND OF THE INVENTION

1. Field of the Invention

The present invention relates to a utility vehicle.

2. Description of the Related Art

Conventionally, for example, as disclosed in US 2014/0103627A, a utility vehicle is a vehicle mainly for traveling off-road, for example, not only on a grass field, a gravel field, and a sandy field but also on an unpaved mountain road, a forest road, a muddy road, and a rocky field.

SUMMARY OF THE INVENTION

When a utility vehicle travels off-road, a travel course is often in poor condition, and for example, a space sufficient for a vehicle body to turn around in order to avoid plural obstacles existing at certain intervals or more may not be secured. In such a case, it is necessary to move the vehicle body back and forth many times while turning a steering wheel, and therefore a utility vehicle is increasingly required to have turning performance.

Accordingly, an object of the present invention is to provide a utility vehicle having improved turning performance.

In order to achieve the above object, an embodiment of the present invention is a utility vehicle including:
a pair of left and right wheels;
a drive source that drives the wheels; and
a control device capable of individually controlling rotational speeds of the wheels,
wherein in a case where the control device determines that a predetermined tight turn execution condition has been satisfied, the control device executes tight turn control for controlling the wheels so that a rotational speed of an outer wheel becomes relatively higher than a rotational speed of an inner wheel in a turning direction of the utility vehicle.

According to the configuration, the tight turn control is executed to control the wheels so that the rotational speed of the outer wheel becomes relatively higher than the rotational speed of the inner wheel, and thereby a turning radius during turning of the utility vehicle can be reduced.

In short, according to the present invention, it is possible to provide a utility vehicle having improved turning performance.

DETAILED DESCRIPTION OF THE PREFERRED EMBODIMENTS

A utility vehicle according to an embodiment of the present invention will be described below with reference to the accompanying drawings. A utility vehicle is a vehicle mainly for traveling off-road, for example, not only on a grass field, a gravel field, and a sandy field but also on an unpaved mountain road, a forest road, a muddy road, and a rocky field, in other words, on an irregular road. For convenience of description, assume that "front, rear, left, right, up, and down" for a driver on a utility vehicle correspond to "front, rear, left, right, up, and down" for the utility vehicle and components thereof in the following description.

[Overall Structure of Vehicle]

Figure 1:
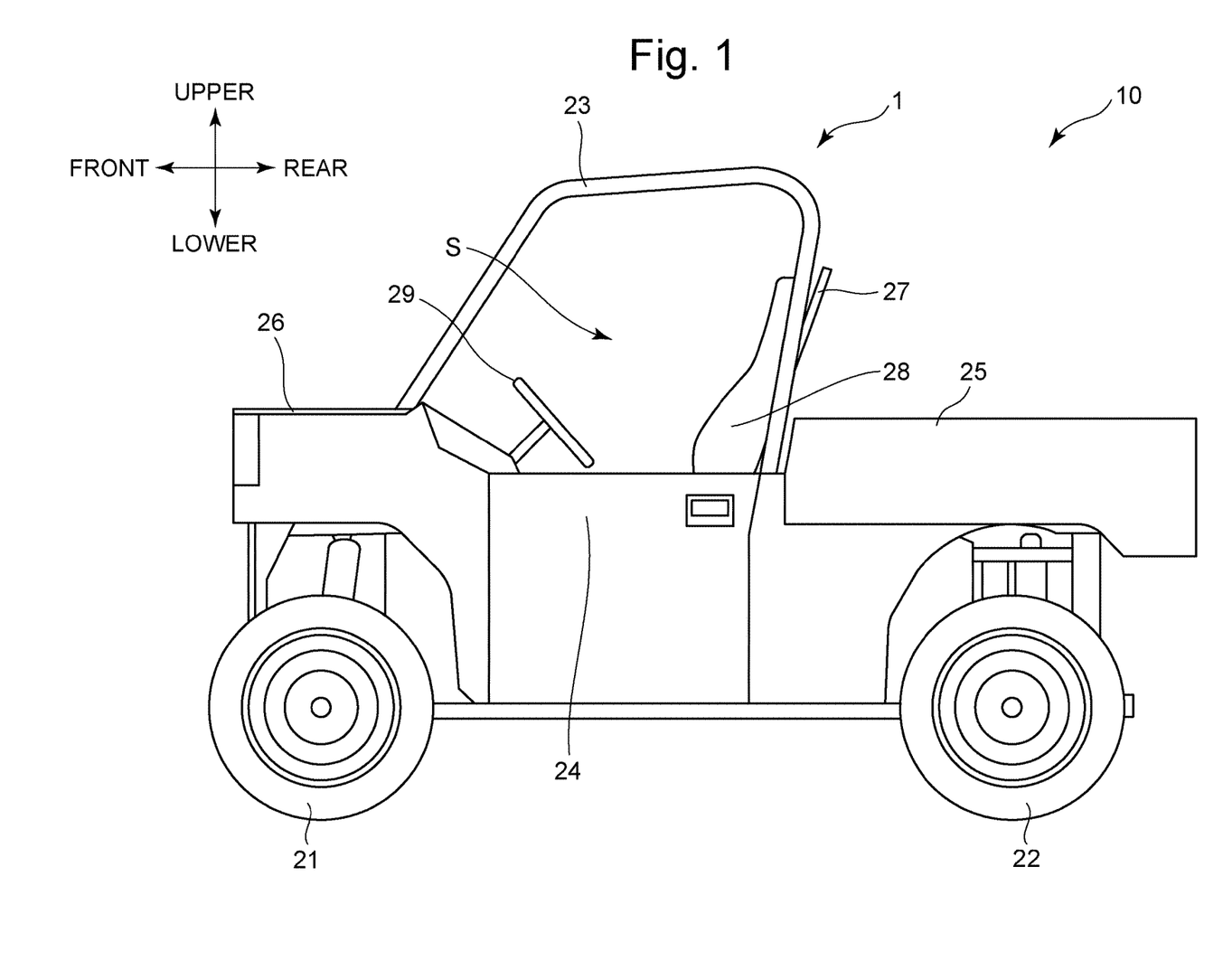
FIG. 1 is a left side view of a utility vehicle according to an embodiment of the present invention.

FIG. 1 is a left side view of a utility vehicle according to the embodiment of the present invention. As illustrated in FIG. 1, a utility vehicle 10 includes a pair of left and right front wheels 21 on a front side of a vehicle body, a pair of left and right rear wheels 22 on a rear side of the vehicle body, and a riding space (cabin) S between the front wheels 21 and the rear wheels 22. The riding space S is surrounded by a ROPS 23 and a pair of left and right doors 24. The ROPS stands for a rollover protective structure and is a part of a vehicle body frame 1. The ROPS 23 is a roll-cage frame structure that protrudes upward as a whole so as to surround the riding space S from above.

A cargo bed 25 is provided behind the riding space S, and a bonnet 26 is provided in front of the riding space S. Furthermore, a back panel 27 that partitions the cargo bed 25 and the riding space S is provided at a front end of the cargo bed 25.

A seat 28 is installed in the riding space S. In front of the seat 28, there is provided a steering wheel 29 which the driver rotates to operate turning to the left and right. The wheels 21 and 22 include steered wheels (in the present embodiment, the front wheels 21) that change a relative direction with respect to the vehicle body in accordance with a traveling direction change command given by the driver with the use of the steering wheel 29 during traveling.

First Embodiment

Figure 2:
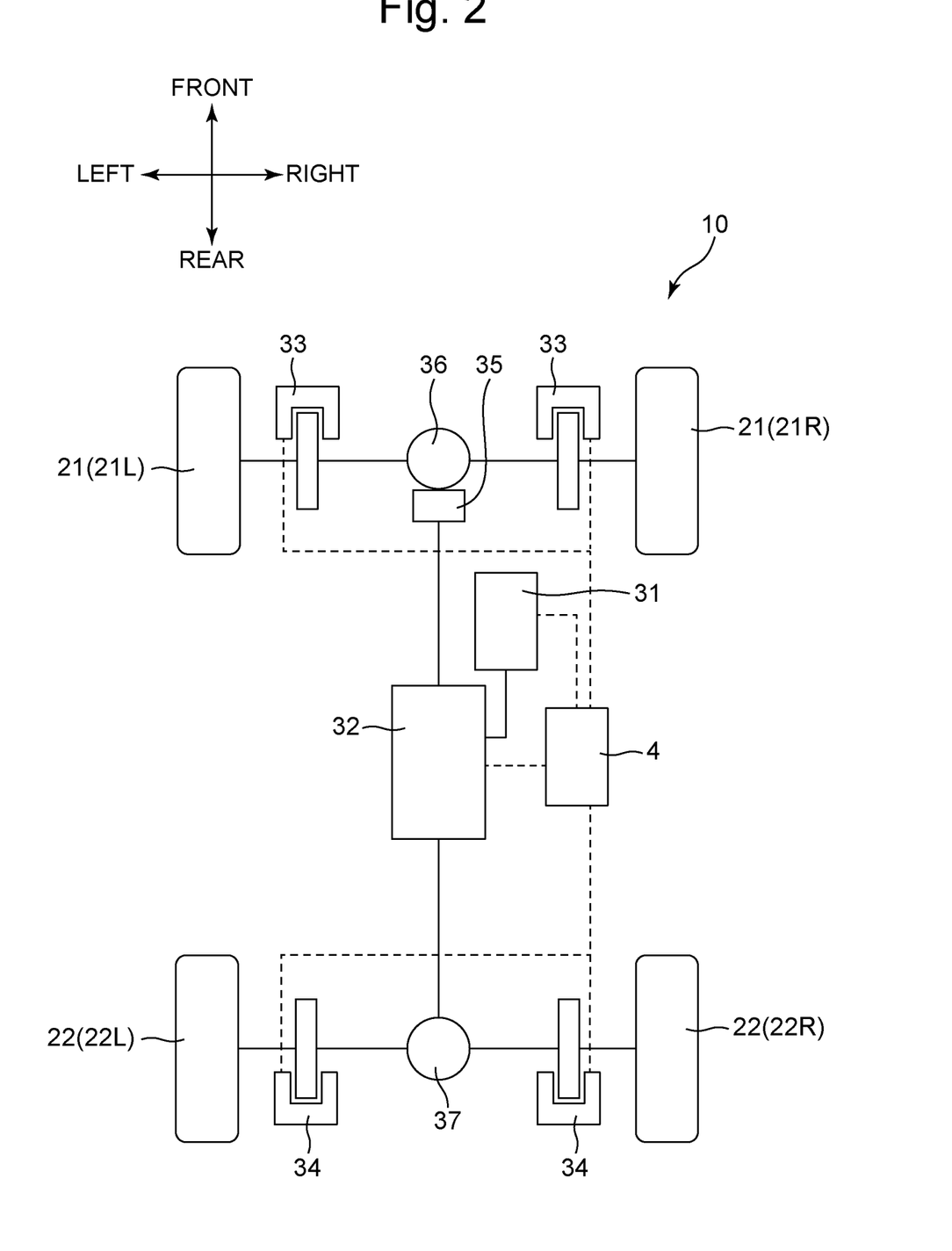
FIG. 2 is a schematic configuration diagram of the utility vehicle.

FIG. 2 is a schematic configuration diagram of the utility vehicle 10 according to the first embodiment. As illustrated in FIG. 2, the utility vehicle 10 includes an engine 31 which is a drive source for driving the wheels 21 and 22, a transmission 32 which converts a driving force of the engine 31 and transmits the driving force to the wheels 21 and 22, and a control device (ECU) 4 which controls the wheels 21 and 22, the engine 31, and the transmission 32. The driving force transmitted to the transmission 32 is transmitted to a front wheel final reduction device and a rear wheel final reduction device. The front wheel final reduction device is provided with a two-wheel four-wheel switching mechanism 35 and a differential mechanism 36. The driving force transmitted to the front wheel final reduction device is switched to be transmitted to the front wheels 21 or not to be transmitted to the front wheels 21 by the two-wheel four-wheel switching mechanism 35, and is distributed to the left and right front wheels 21 by the front wheel differential mechanism 36. The rear wheel final reduction device is provided with a rear wheel differential mechanism 37, and the driving force transmitted to the rear wheel final reduction device is distributed to the left and right rear wheels 22 by the rear wheel differential mechanism 37. That is, the utility vehicle 10 has a structure in which each of front and rear wheel shafts is not a single shaft on the left and right. That is, left and right wheel shafts are connected by a differential mechanism. The left and right wheel shafts are configured to transmit driving force independently.

Each of the wheels 21L and 21R and wheels 22L and 22R includes a system capable of performing brake control individually. In the present embodiment, this is realized by electronically controlled brake systems 33 and 34. To perform brake control, the front and rear electronically controlled brake systems 33 and 34 provide a command to a solenoid valve to guide accumulated brake oil to a brake device and thereby drive the brake device. For example, existing antilock brake system (ABS) devices may be applied. The front left and right electronically controlled brake systems 33 need not be independent of each other and the rear left and right electronically controlled brake systems 34 need not be independent of each other. A system in which a brake pad is directly operated by an actuator or a mechanical force system using a wire may be used as a system capable of individually controlling braking of the vehicle described above instead of an electronically controlled brake system that controls whether or not to supply pressure energy. According to the configuration using the electronically controlled brake system, the entire system can be reduced in weight, and fine adjustment and setting can be easily performed when different rotational speeds are set. On the other hand, according to the latter configuration, the system can be realized with a simple structure, and maintenance and repair can be more easily performed. A clutch may be used to individually drive the front and rear wheels 21 and 22.

Figure 3:
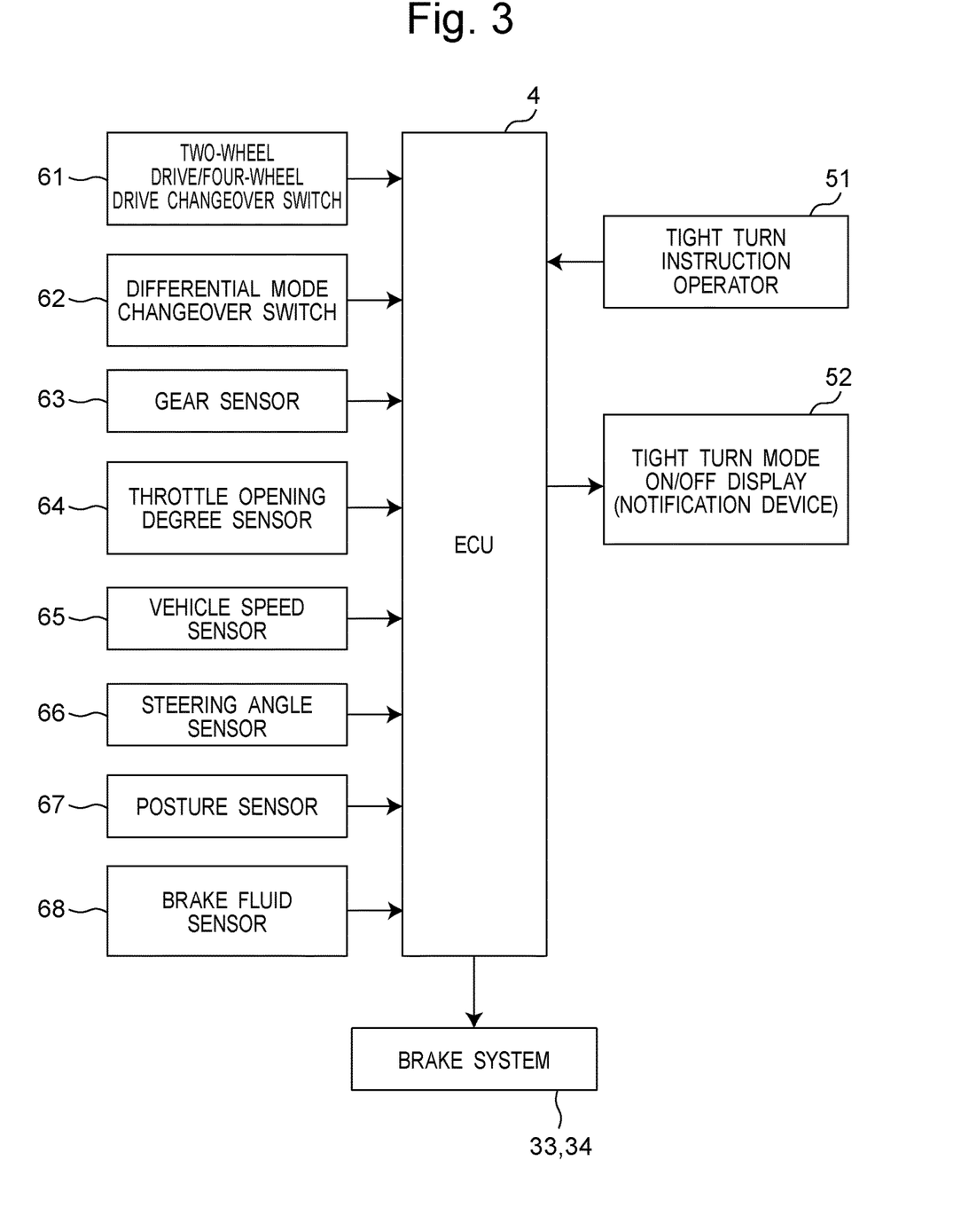
FIG. 3 is a connection configuration diagram of a control device.

FIG. 3 is a block diagram of the control device 4. As illustrated in FIG. 3, the control device 4 is connected to a tight turn instruction operator 51, a notification device 52, various switches 61 and 62, and sensors 63 to 68. The utility vehicle 10 includes the tight turn instruction operator 51 that shifts the utility vehicle 10 to tight turn control, and the notification device 52 that notifies the driver that the utility vehicle 10 is performing the tight turn control. When the driver operates the tight turn instruction operator 51, the control device 4 detects the operation by a shift instruction sensor that detects an instruction to shift to the tight turn control, and executes the tight turn control. Furthermore, the control device 4 causes the notification device 52 to notify that the tight turn control is being performed during the tight turn control. For example, the tight turn instruction operator 51 is realized by a push button, a switch, or the like. For example, the notification device 52 is a device that realizes notification to the driver by sound, light (lamp lighting), display (display on a display device), or the like. In the present embodiment, the tight turn instruction operator 51 is realized by a push button provided within the reach of the driver on the driver's seat, for example, provided on a dash panel. In the present embodiment, the notification device 52 is realized by an instrument panel indicating various operation statuses. In this case, the driver can grasp that tight turn control is being performed based on a change in display content of the instrument panel.

As for the various switches 61 and 62 and the sensors 63 to 68, more specifically, the utility vehicle 10 includes a two-wheel drive/four-wheel drive changeover switch 61 that gives a switching command between two-wheel drive and four-wheel drive, a differential mode changeover switch 62 that detects switching between a differential state and a differential lock state, a gear sensor 63 that detects a gear state of the transmission 32, a throttle opening degree sensor 64 that detects a throttle opening degree, a vehicle speed sensor 65 that detects a vehicle speed, a steering angle sensor 66 that detects a steering angle and a steering angular velocity of the steering wheel 29, a posture sensor 67 that detects a vehicle posture, and a brake fluid sensor 68 that detects a state of brake fluid. The two-wheel drive/four-wheel drive changeover switch 61 performs a driving state switching command from the driver (a command for switching from two-wheel drive (rear wheel driving, front wheel driven state) to four-wheel drive (front rear wheel driving state) or switching from four-wheel drive to two-wheel drive). The differential mode changeover switch 62 detects operating and locked states of the differential mechanisms 36 and 37 in the differential mechanisms 36 and 37. The gear sensor 63 detects a change in a gear connection state and a gear position of the transmission 32. The throttle opening degree sensor 64 detects a throttle opening degree of the engine 31. The vehicle speed sensor 65 detects a vehicle speed of the utility vehicle 10 based on a rotation speed of an axle. The steering angle sensor 66 detects driver's steering angle and steering angular velocity of the steering wheel 29. The posture sensor 67 detects an inclination of the vehicle body of the utility vehicle 10. The posture sensor 67 can be realized, for example, by a gyro sensor. The posture sensor 67 can also be realized by using a stroke sensor that detects a vertical stroke amount of the left and right wheels. For example, the posture sensor 67 detects a vehicle body posture around a front-rear axis passing a center of gravity of the vehicle body, a vehicle body posture around a vehicle width axis passing the center of gravity of the vehicle body, and a vehicle body posture around a vertical axis passing the center of gravity of the vehicle body, and detects temporal changes in these postures. The brake fluid sensor 68 detects a braking torque amount. For example, the brake fluid sensor 68 may detect a state of the brake fluid, basically pressure of the brake fluid. Further, the brake fluid sensor 68 may detect temperature of the brake fluid or a brake pad.

[Control of Control Device]

Figure 4A:
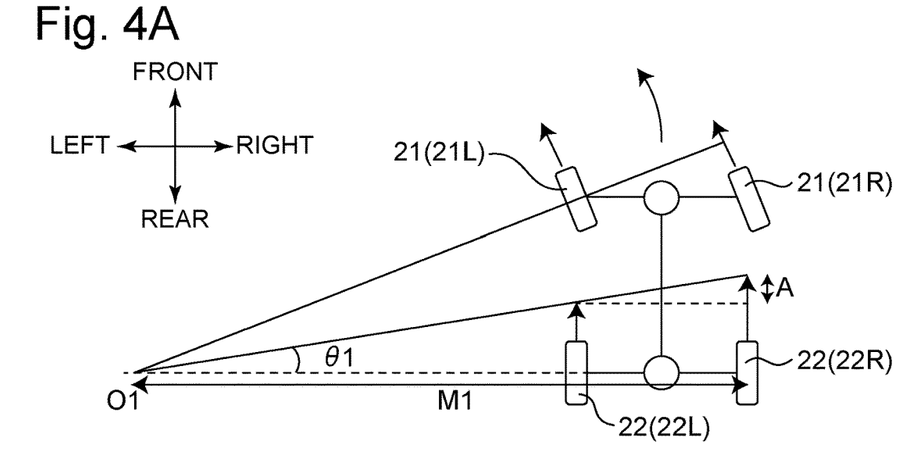
FIG. 4A is an explanatory view of the utility vehicle that turns left during normal traveling.
Figure 4B:
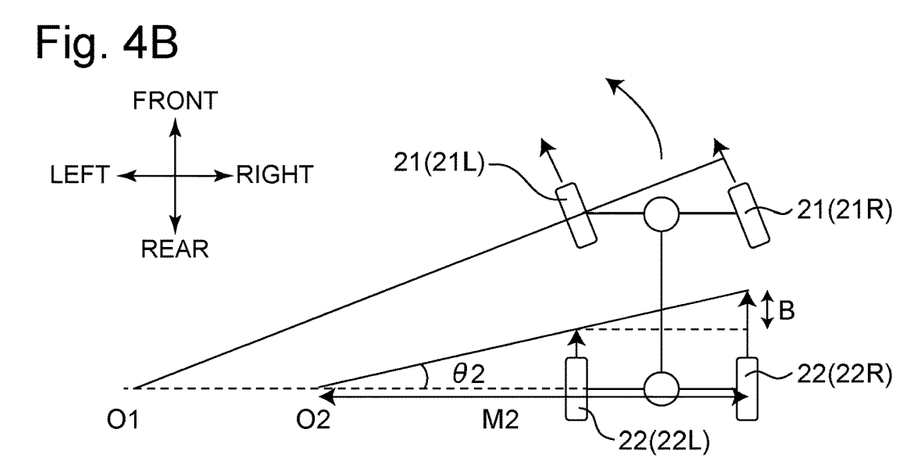
FIG. 4B is an explanatory view of the utility vehicle that turns left during execution of tight turn control.
Figure 4C:
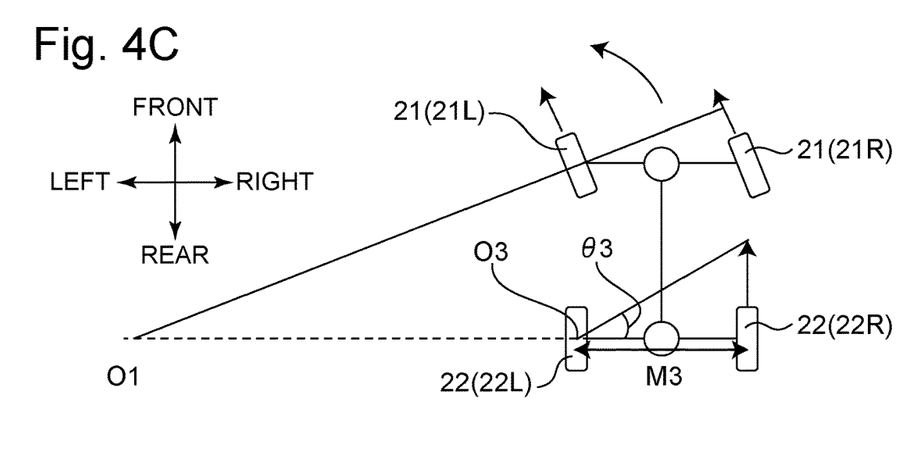
FIG. 4C is an explanatory view of the utility vehicle that turns left by braking inner wheels during execution of tight turn control.

The utility vehicle 10 according to the present embodiment has tight turn control (small turning radius turning mode) for improving at least turning performance of the utility vehicle 10 in addition to a mode for normal traveling, and can travel while switching between the modes as necessary. In the tight turn control, the control device 4 performs wheel control so that a rotational speed of an outer wheel (with respect to a turning direction) becomes relatively higher than a rotational speed of an inner wheel in a turning direction of the utility vehicle 10 (i.e., the control device 4 actively controls a rotational speed of the inner and outer wheel). FIG. 4A is an explanatory view of a utility vehicle that turns left during normal traveling (i.e., wheel 21R is the outside wheel); FIG. 4B is an explanatory view of a utility vehicle that turns left during execution of tight turn control; FIG. 4C is an explanatory view of a utility vehicle that turns left by braking inner wheels during execution of tight turn control. In the mode for performing the normal traveling, the tight turn control is not executed, but this mode also includes a state in which the differential mechanism is operating. As illustrated in FIGS. 4A to 4C, during the tight turn control, the control device 4 specifically performs wheel control so that a turning angle of the outer wheels with respect to a turning center is larger than a turning angle during normal traveling. In other words, the wheel control is performed such that arc angles θ2 and θ3 of an arc trajectory on which the outer wheels move become larger than an arc angle θ1 of an arc trajectory on which the outer wheels move during normal traveling. As shown in FIG. 4A, even during normal traveling, the differential mechanism controls the rotational speed of the outer wheel to be relatively higher than that of the inner wheel (indicated by A). However, as shown in FIG. 4B, in tight turn control, the control unit 4 controls the rotational speed of the outer wheel to be much higher relative to the rotational speed of the inner wheel (B is greater than A). The tight turn control also includes a case where the inner wheels are locked (prevented from moving) (see FIG. 4C). In this case, the control device 4 controls the wheels so that a rotational motion component using the inner wheels as a fulcrum O3 is generated in the outer wheels. In the present embodiment, as the tight turn control, the control device 4 increases a braking amount of the inner wheels as compared with a braking amount of the outer wheels. Specifically, the control device 4 brakes the inner wheels without braking the outer wheels. In the braking state, the left and right brake devices operate in conjunction with each other. In the utility vehicle 10, since the outer wheels rotate independently by the differential mechanism, a large difference in rotational speed occurs between the inner wheels and the outer wheels during the tight turn control. In this manner, as a result of execution of the tight turn control by the control device 4, the utility vehicle 10 operates so as to have a rotational motion component of a spinning component. When the utility vehicle 10 turns left, the outer wheels correspond to the right wheels 21R and 22R, and the inner wheels correspond to the left wheels 21L and 22L. When the utility vehicle 10 turns right, the outer wheels correspond to the left wheels 21L and 22L, and the inner wheels correspond to the right wheels 21R and 22R.

In the present embodiment, the utility vehicle 10 is controlled such that the tight turn control is executed when the utility vehicle 10 travels at a predetermined speed (for example, 5 km/h) or less. The utility vehicle 10 may be controlled such that the vehicle speed does not exceed the predetermined speed during the tight turn control. For example, a method of monitoring the vehicle body speed by using a speed sensor and setting a limit on power source output may be used or a method of determining a certain rotational speed of the power source in advance and controlling the power source so as not to exceed this rotational speed may be used. The utility vehicle 10 may be controlled so that the tight turn control is not executed unless the utility vehicle 10 is at the predetermined speed or less. Unlike the normal traveling using a differential mechanism in which power is distributed by a mechanical structure, the tight turn control generates a difference in rotational speed larger than a difference in rotational speed generated by a rotational radius based on steering (a rotational radius based on a wheel steering angle displacement during the normal traveling) by electronic control. During the tight turn control in which the inner wheels are locked, a rotational motion component whose rotation fulcrum is the grounded inner wheels is generated. During the tight turn control in which braking is performed so that the rotational speed of the inner wheels is decreased while maintaining rotation of the inner wheels, a rotational motion component whose rotation fulcrum is at a position closer to the vehicle body than a turning center of steering is generated. For example, as a result of execution of the tight turn control, a movement trajectory of the outer wheels becomes non-concentric with respect to a movement trajectory of the inner wheels, that is, in passage of time, a reduction width of a radius change of the outer wheels becomes larger than a reduction width of a radius change of the inner wheels with respect to the turning center, that is, a reduction width compared to turning in a state where the tight turn control is not executed. In turning in the normal traveling state that is not the tight turn control, the vehicle normally turns about the turning center as a fulcrum unless a steering angle is changed. That is, in the normal traveling state, the turning radii of the inner wheels and the outer wheels are kept constant during turning. On the other hand, when the control shifts to the tight turn control during the turning, a change width of the turning radius of the outer wheels becomes larger than a change of the turning radius of the inner wheels with respect to the turning center even when the steering angle is the same. In addition to revolving operation of turning, a rotation component of a spinning component of the vehicle body itself is generated. Shift to the tight turn control is possible even in a state where steering operation is not performed. Note that the wheel control may be performed so that a rotational speed of an outer wheel becomes relatively higher than a rotational speed of an inner wheel by reversely rotating the inner wheel.

As illustrated in FIGS. 4B and 4C, in the present embodiment, when the utility vehicle 10 turns left, during the tight turn control, the control device 4 controls the wheels 22 on the rear side (wheels different from the front wheels 21 which are steered wheels) with respect to the traveling direction of the utility vehicle 10 so that the rotational speed of the inner wheel 22L becomes lower than the rotational speed of the outer wheel 22R with respect to the turning direction of the utility vehicle 10. Specifically, the control device may brake the inner wheel 22L by controlling the electronically controlled brake system 34 in order to make the rotational speed of the inner wheel 22L lower than the rotational speed of the outer wheel 22R. The inner wheel 22L may be prevented from being driven by using a differential mechanism or a mechanism that connects/blocks power to the inner wheel 22L. By executing the tight turn control, the turning radii M2 and M3 of turning during the tight turn control can be made smaller than the turning radius M1 of turning during normal traveling of a conventional utility vehicle. Although a case where the utility vehicle 10 moves forward has been described above, the wheels on the rear side with respect to the traveling direction correspond to the wheels 21 since when the utility vehicle 10 moves backward, the traveling direction is a backward direction. Therefore, when the utility vehicle 10 turns left while moving backward, during the tight turn control, the control device 4 controls the wheels 21 on the rear side with respect to the traveling direction of the utility vehicle 10 so that the rotational speed of the inner wheel 21L becomes lower than the rotational speed of the outer wheel 21R with respect to the turning direction of the utility vehicle 10. When the utility vehicle 10 turns right while moving backward, during the tight turn control, the control device 4 controls the wheels 21 on the rear side with respect to the traveling direction of the utility vehicle 10 so that the rotational speed of the inner wheel 21R becomes lower than the rotational speed of the outer wheel 21L with respect to the turning direction of the utility vehicle 10.

In the present embodiment, the control device 4 controls the wheels 21 on the rear side with respect to the traveling direction of the utility vehicle 10 so that the rotational speed of the inner wheel 21L becomes lower than the rotational speed of the outer wheel 21R with respect to the turning direction of the utility vehicle 10, but the control device 4 determines the traveling direction and a steering direction of the utility vehicle 10 and selects a wheel to be controlled. In the present embodiment, the tight turn control is realized by lowering a rotational speed of an inner wheel, but may be realized by increasing a rotational speed of an outer wheel. A method of lowering the rotational speed of the inner wheel can be a suitable method for tight turn control during forward movement in a case of two-wheel drive using only rear wheels.

In the present embodiment, the inner wheels may be braked to be locked, but it is only necessary that a speed difference between the inner and outer wheels can be increased, and a case where the rotational speed of the inner wheels is decreased by braking is also included in the present invention. In a case where steered wheels are drive wheels, a rotational speed of an inner one of the steered wheels may be decreased. The driver may select an inner wheel serving as a fulcrum based on a selection command as to which one of front and rear inner wheels in the traveling direction of the utility vehicle is used as a fulcrum to turn the vehicle.

Although it is preferable to brake an inner one of the pair of left and right drive wheels, a difference in speed between inner and outer wheels may be generated by braking an inner one of driven wheels (an inner one of the front wheels in the present embodiment). Although a configuration in which a rotation difference is generated between inner and outer wheels on the rear side with respect to the traveling direction is most preferable, for example, a configuration in which a rotation difference is generated between inner and outer wheels on the same side (the front side in the present embodiment) as the traveling direction may be adopted.

Figure 5:
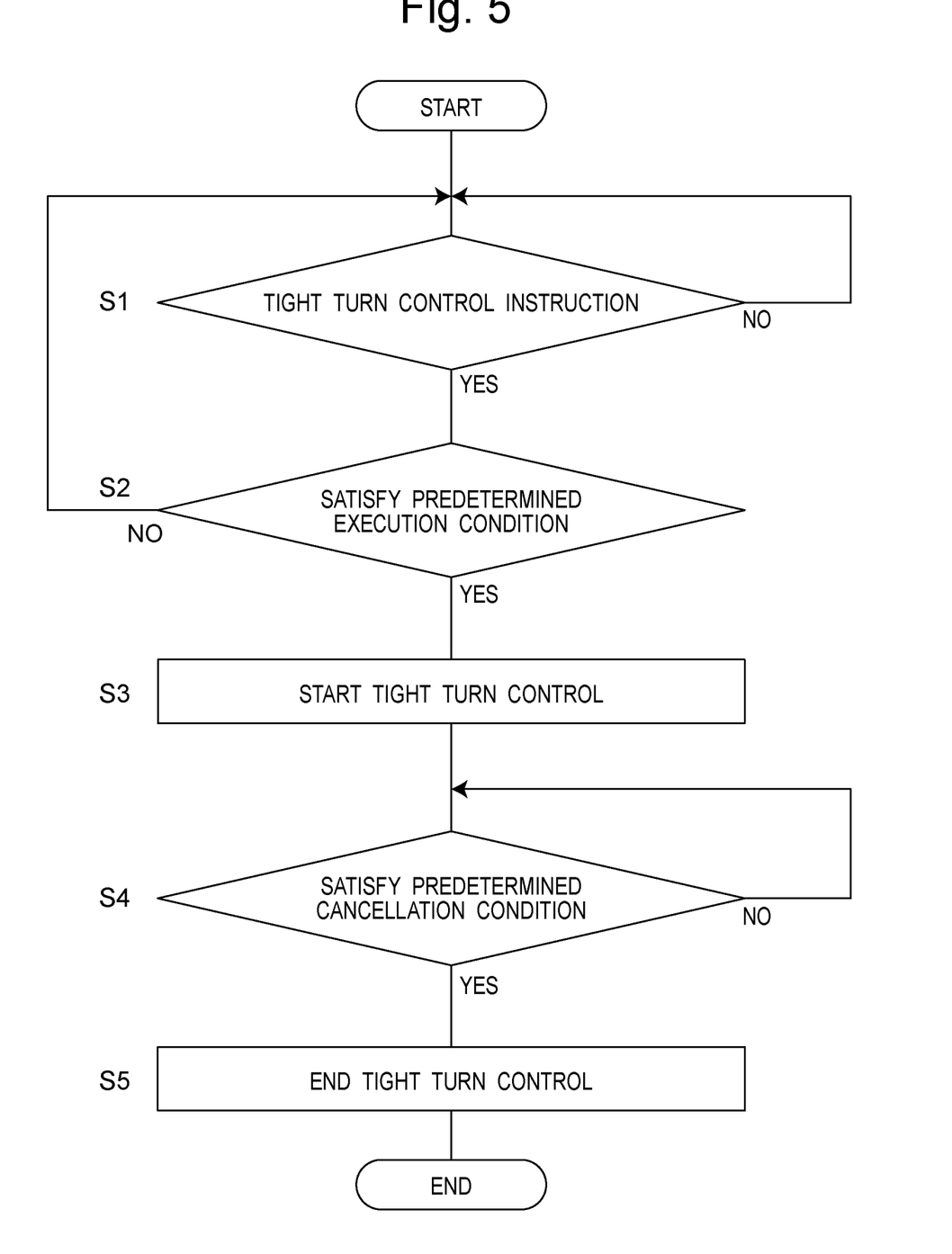
FIG. 5 is a flowchart for explaining tight turn control.

FIG. 5 is a flowchart for explaining tight turn control. When the driver operates the tight turn instruction operator 51 and the control device 4 determines that an instruction to perform the tight turn control has been given (S1), the control device 4 checks whether the utility vehicle 10 satisfies a predetermined tight turn execution condition (S2). When there is no instruction to perform the tight turn control, the control device 4 continues normal traveling and waits until an instruction to perform the tight turn control is given.

In a case where the predetermined tight turn execution condition is satisfied, the control device 4 executes the tight turn control. The control device 4 waits until the predetermined tight turn execution condition is satisfied. The tight turn execution condition includes a condition that right and left wheels between which a difference in rotational speed is to be generated are in a state that is not locked by the differential mechanism. Furthermore, the tight turn execution condition may include a condition that an elapsed time from the tight turn control instruction is within a predetermined time.

As the tight turn execution condition, a condition that a steering angle is greater than or equal to a predetermined tight turn control start threshold value may be set. This makes it easy to reflect a sudden turning intention of the driver. As the tight turn execution condition, a vehicle state in which the tight turn can be smoothly executed may be set as the tight turn execution condition. For example, the tight turn execution condition is set so that a sudden change in the vehicle body posture is prevented when the tight turn control is executed. For example, a condition that a vehicle speed or an engine rotational speed becomes equal to or less than a predetermined value may be set. Furthermore, a condition that a throttle opening degree or a driver's acceleration instruction is equal to or less than a predetermined value may be set. This prevents the tight turn control from being executed in a high-speed or high-output state.

As the tight turn execution condition, a condition that acceleration or deceleration (a braking amount) is equal to or less than a predetermined value may be set. This prevents the tight turn control from being executed in a state where inertial force acting in the front-rear direction is large.

As the tight turn execution condition, a condition that the steering angle or the steering angular velocity is equal to or less than a predetermined tight turn inadequacy threshold value may be set. Furthermore, a condition that centrifugal force obtained based on the vehicle speed and the steering angle is equal to or less than a predetermined value may be set. This prevents the tight turn control from being executed in a state where external force in the turning direction given to the vehicle body is equal to or greater than a predetermined value.

As the tight turn execution condition, a condition that inclination to an outer side in the turning radius with respect to the vehicle body posture about the front-rear axis is equal to or less than a predetermined value may be set or a condition that a height of the center of gravity of the vehicle body by loading of luggage or the like is equal to or less than a predetermined value may be set. Furthermore, a condition that a stroke amount of the inner wheels correlated with a vertical load on the inner wheels is equal to or less than a predetermined value may be set. This also prevents the tight turn control from being executed in a state where the load on the inner wheels is small during turning.

Such setting is also possible in which the tight turn execution condition is not satisfied when an abnormal state is detected. For example, such setting is also possible in which the tight turn execution condition is not satisfied when a temperature of the brake device to be braked during the tight turn control is equal to or higher than a predetermined temperature. As described above, setting may be made so that the tight turn execution condition is not satisfied when an actuator or a sensor is in an abnormal state or an out-of-tolerance state.

In a case where the control device 4 determines that the tight turn control execution condition is satisfied, the control device 4 executes the tight turn control described above and activates the notification device 52 (S3). Specifically, the control device 4 determines an inner wheel to be braked based on the traveling direction and the steering direction. Specifically, the control device 4 determines the traveling direction based on a rotation direction of the wheels or a detection value of the gear sensor or the like. Furthermore, the control device 4 determines the steering direction based on a detection value of the steering angle sensor 66. In this way, the control device 4 determines the wheel to be braked and gives a braking command to a braking device corresponding to the determined wheel. In the present embodiment, an inner wheel on the rear side in the traveling direction is determined as a wheel to be braked and a braking command is given. In this manner, the tight turn control is started (S3).

When the utility vehicle 10 is in a tight turn control state, the control device 4 checks whether or not the utility vehicle 10 satisfies a predetermined cancellation condition (S4), and ends the tight turn control when the predetermined cancellation condition is satisfied (S5). The cancellation condition may include a condition that a predetermined time has elapsed from the start of the tight turn control.

In the present embodiment, the predetermined cancellation condition may be defined by a predetermined operation state of the utility vehicle 10. In this case, the predetermined operation state includes a predetermined state such as a temporal change in traveling behavior of the utility vehicle 10 or a driving allowance degree. The temporal change in traveling behavior of the utility vehicle 10 may include sudden steering, sudden acceleration/deceleration, and the like of the utility vehicle 10. The driving allowance degree corresponds to a resistance force against a posture change of the vehicle body about the central axis extending in the front-rear direction. The driving allowance degree is set larger as the resistance force becomes larger. Parameters for obtaining the driving allowance degree may include a turning radius, a turning speed, a position of a center of gravity in the vertical direction, centrifugal force applied to the vehicle body during turning, an inclination of a traveling surface during traveling, and the like. The driving allowance degree is set smaller as the centrifugal force becomes larger. The centrifugal force may be directly detected by using an acceleration sensor or the like or may be calculated based on acquired values such as a turning radius, a turning speed, and a mass of the vehicle. Further, the driving allowance degree is set smaller as the center of gravity becomes higher. The position of the center of gravity may be estimated to become higher as the number of passengers increases. The number of passengers may be estimated on the basis of an extension/contraction amount of a suspension or an acceleration obtained in response to an acceleration command. The driving allowance degree is set smaller as the load (suspension contraction amount) applied to the outer wheels with respect to the inner wheels becomes larger. The driving allowance degree is set larger as an inclination amount of upward inclination of a traveling road surface toward an outer side in the turning direction becomes larger. The driving allowance degree is set smaller as an inclination amount of downward inclination of the traveling road surface toward the outer side in the turning direction becomes larger. The driving allowance degree is set smaller as irregularities of the traveling road surface become larger. The irregularities of the traveling road surface may be estimated according to an extension/contraction amount of a front-rear suspension.

The predetermined operation state may also include a brake fluid temperature, a driver's output request to the drive source, a driver's braking request, and the like. The utility vehicle 10 includes, for example, the switches 61 and 62 and the sensors 63 to 68 that detect the predetermined operation states, and the control device 4 ends the tight turn control when the control device 4 recognizes that the values of the utility vehicle 10 obtained by the switches 61 and 62 and the sensors 63 to 68 have exceeded predetermined values.

The cancellation condition may include a mode switching command given by the driver. For example, when the control device 4 determines that the mode switching command has been given by the driver, the control device 4 ends the tight turn control. Specifically, the control device 4 may end the tight turn control when the two-wheel drive/four-wheel drive switching is detected by the two-wheel/four-wheel drive changeover switch 61. Furthermore, the control device 4 may end the tight turn control when switching from the differential state to the differential lock state is detected by the differential mode changeover switch 62. Furthermore, the control device 4 may end the tight turn control when switching of the gear of the transmission 32 is detected by the gear sensor 63. Furthermore, in a case where modes that can be changed are set in the utility vehicle, the tight turn control may be ended when switching between the modes is determined. For example, in a case where output characteristics can be changed, specifically, in a case where a power mode in which responsiveness to an output change request is increased and an output suppression mode in which the responsiveness is suppressed are set, the tight turn control may be ended when switching between the modes is determined. As the request or cancellation condition, it may be determined that the cancellation condition has been satisfied when the above predetermined execution condition is no longer satisfied during the tight turn control.

The cancellation condition may include an end condition corresponding to the end of the driver's intention to turn. The tight turn control may be ended when the end condition is satisfied. For example, as the end condition, the driver may give a tight turn control end command to the control device by operating an operator. Furthermore, other conditions may be included as the end condition. For example, when the throttle opening degree sensor 64 detects a predetermined throttle opening degree or more, the control device 4 may determine that there is an intention to accelerate after end of turning and end the tight turn control. Furthermore, when the vehicle speed sensor 65 detects a vehicle speed equal to or higher than a predetermined value, the control device 4 may determine that there is an intention to accelerate after end of turning and end the tight turn control. Furthermore, the control device 4 may determine that a turning end instruction has been given based on a detection value of the steering angle sensor 66 and end the tight turn control. For example, when the control device 4 determines that the steering angle has returned to a value less than a predetermined value (that is, has approached a straight traveling state) or that the steering angular velocity has changed to approach the straight traveling state, the control device 4 may determine that turning has been ended and end the tight turn control. When it is determined, as the end condition, that a braking command has been given by the driver, the tight turn control may be ended.

When, as the cancellation condition, the posture sensor 67 detects a predetermined inclination or more (inclination around the front-rear axis, the vehicle width axis, or the vertical axis) of the vehicle or when the brake fluid sensor 68 detects a predetermined brake temperature or brake pressure or more, the tight turn control is ended in a case where the utility vehicle 10 is in the tight turn control. That is, in the present embodiment, it is assumed that the tight turn control is performed at a low speed, and the tight turn control is cancelled when the gear is switched to a high speed gear due to a gear change. Furthermore, during the tight turn control, it is assumed that the vehicle body moves forward while braking by the brake is continuously performed, and this may cause the brake fluid to have a high temperature. When the brake fluid reaches an extremely high temperature, there is a possibility that brake operation by hydraulic pressure cannot be performed due to boiling of the brake fluid, and therefore the tight turn control is ended in a case where the fluid temperature becomes equal to or higher than a threshold value or exceeds the threshold value for a certain time or more. The control device 4 may end the tight turn control on the basis of not only the brake fluid temperature but also a state of an actuator that performs wheel control such as a temperature of a brake pad and a current value of an electric motor.

Further, the steering angle sensor 66 may include a steering wheel rotation angle detection sensor. During the tight turn control, when the steering angle sensor 66 detects a steering wheel rotation angle or a wheel steering angle equal to or larger than a predetermined threshold value, the control device 4 may perform wheel control so that a rotational speed of an outer wheel becomes relatively higher than a rotational speed of an inner wheel as compared with the tight turn control performed in a case where the steering wheel rotation angle or the wheel steering angle is less than the predetermined threshold value. For example, a difference in rotational speed between the inner and outer wheels may be set larger as the detected rotation angle of the steering wheel becomes larger. Specifically, a braking amount of the inner wheels is increased as the steering angle or the steering wheel rotation angle increases. Such control allows the driver to intuitively adjust a turning radius of a turn based on a magnitude of the steering wheel rotation angle. The control device 4 may perform the wheel control based on not only the steering angle sensor 66, but also a traveling behavior sensor that detects a traveling speed, a turning radius, and the like of the utility vehicle 10.

A condition for preventing execution of the tight turn control may be the same as the cancellation condition of the tight turn control. Note that not all of the conditions described above need be satisfied to cancel the tight turn control, and some conditions may be appropriately combined or a certain condition may be omitted. For example, the present invention can also be applied to a two-wheel drive only vehicle without switching between two-wheel drive and four-wheel drive and a vehicle without a differential lock mechanism.

The utility vehicle 10 thus configured achieves the following effects.

(1) The utility vehicle 10 has tight turn control, and during the tight turn control, the control device 4 can reduce a turning radius during turning of the utility vehicle 10 by performing wheel control so that a rotational speed of an outer wheel becomes relatively higher than a rotational speed of an inner wheel. This allows the utility vehicle 10 to make a small turn and therefore travel while avoiding obstacles and makes it easy to travel while tracing a traveling path of a steep turning radius.

(2) Since each of the wheels 21 and 22 is controlled by a system capable of performing brake control individually, the wheel control performed so that a rotational speed of an outer wheel becomes relatively higher than a rotational speed of an inner wheel can be realized by braking of the wheels 21 and 22.

(3) Each of the wheels 21 and 22 is controlled by an electronically controlled brake system, and the electronically controlled brake systems 33 and 34 that easily enable detailed adjustment electronically are adopted to mount a brake in each of the wheels 21 and 22, and therefore it is possible to distribute appropriate braking force to the wheels 21 and 22, and it is easy to perform fine adjustment and setting when wheel control is performed so that a rotational speed of an outer wheel becomes relatively higher than a rotational speed of an inner wheel.

(4) During the tight turn control, the control device 4 controls wheels on the rear side in the traveling direction of the utility vehicle 10 so that a rotational speed of an outer wheel becomes relatively higher than a rotational speed of an inner wheel in a turning direction of the utility vehicle 10. Therefore, a turning radius during turning of the utility vehicle 10 can be reduced by decreasing a rotational speed of a wheel on the inner side in the turning direction and on the rear side in the traveling direction or increasing a rotational speed of a wheel on the outer side in the turning direction and on the rear side in the traveling direction.

(5) During the tight turn control, the control device 4 does not execute the tight turn control unless the utility vehicle 10 satisfies a predetermined execution condition. This can prevent the tight turn control from being executed in an undesired state.

(6) The utility vehicle 10 includes the tight turn instruction operator 51 that shifts the utility vehicle 10 to the tight turn control, and therefore the tight turn control can be executed by a driver's operation of the tight turn instruction operator 51. Furthermore, the tight turn control can be easily executed in a situation and at a timing intended by the driver as compared with a case where the control device 4 determines a tight turn control state on the basis of various sensors and the like.

(7) Since the utility vehicle 10 includes the notification device 52 that notifies the driver of the tight turn control, the driver can easily recognize that the utility vehicle 10 is in the tight turn control and can easily grasp a traveling state of the utility vehicle 10.

(8) Since the control device 4 ends the tight turn control when the utility vehicle 10 satisfies a predetermined cancellation condition, the tight turn control is not performed when the utility vehicle 10 satisfies the predetermined cancellation condition, and thereby operation stability of the utility vehicle 10 can be improved.

(9) The control device 4 performs wheel control so that a rotational speed of an outer wheel becomes relatively higher than a rotational speed of an inner wheel on the basis of a steering wheel rotation angle detected by a steering wheel rotation angle detection sensor. Therefore, for example, when the driver operates the steering wheel by a larger amount, a radius of turning is set smaller (that is, a difference in rotational speed between wheels is set larger), and thereby the driver can intuitively feel the tight turn control easily.

(10) Since the utility vehicle 10 has a roll-cage frame structure, the present invention is suitably applied to a case where a vehicle having a roll-cage frame structure (ROPS) that considers a possibility of overturning or the like travels while making small turns on irregular ground with scattered obstacles.

(11) Since the utility vehicle 10 includes the cargo bed 25, the present invention is suitably applied to a case where a vehicle that has the cargo bed 25 and does not want to change its posture suddenly or greatly for cargo travels while making small turns on irregular ground with scattered obstacles.

(12) Since the predetermined cancellation condition is defined by the brake fluid temperature, the tight turn control is not performed when the brake fluid temperature is high, whereby the brake operability of the utility vehicle 10 can be stabilized.

(13) Since the predetermined cancellation condition is defined based on a state of an actuator that controls the wheel control of the control device 4, the utility vehicle 10 can be given driving allowance degree by preventing the tight turn control from being executed, for example, in a case where an output request to a drive source is high.

(14) Since the predetermined cancellation condition is defined by a vertical load applied to the inner wheels, operation stability of the utility vehicle 10 can be improved by preventing the tight turn control from being executed in a case where the vertical load applied to the inner wheels is high.

(15) Since the predetermined cancellation condition is defined by a position of a center of gravity of the utility vehicle 10, operation stability of the utility vehicle can be improved by preventing the tight turn control from being executed in a case where the position of the center of gravity is high.

(16) Since the predetermined cancellation condition is defined by centrifugal force applied to the vehicle body of the utility vehicle 10 during turning, operation stability of the utility vehicle 10 can be improved by preventing the tight turn control from being executed in a case where the centrifugal force is large.

(17) The wheels include a steered wheel (in the present embodiment, the front wheels 21) that change a relative direction with respect to the vehicle body in accordance with a traveling direction change command from the driver during traveling, and during the tight turn control, the control device 4 controls wheels different from the steered wheels so that a rotational speed of an outer wheel becomes relatively higher than a rotational speed of an inner wheel. Therefore, in the tight turn (small-radius turning) assumed in the present invention, it becomes easier to perform turning without difficulty without causing dragging or the like of the wheels as a distance between the inner wheel which is a center of the turning and the steered wheels becomes larger.

(18) Since the tight turn control is ended when the cancellation condition is satisfied, it is possible to prevent the tight turn control from being continued. For example, in a case where the tight turn control is ended based on a driver's command, control according to a driver's intention can be easily realized. Furthermore, in a case where the tight turn control is ended based on a condition different from the driver's command, convenience can be improved without the need for the driver to give an instruction again. Furthermore, in a case where the cancellation condition is based on determination about a turning end state, it is possible to prevent the tight turn control from being undesirably continued.

(19) The cancellation condition may be set based on a temporal change in traveling behavior. Specifically, the cancellation condition may be satisfied when a temporal change in traveling behavior becomes equal to or greater than a predetermined value. The temporal change in traveling behavior is correlated with future traveling behavior exhibited when the tight turn control is continued. It is therefore easy to execute cancellation determination based on the future behavior. For example, the tight turn control can be ended on the basis of a sign of a change such as sudden steering, sudden acceleration/deceleration, or a sudden posture change. As a result, the tight turn control can be ended at a timing based on a driver's intention or a timing before the traveling behavior becomes large.

(20) In a case where the cancellation condition is set based on a driving allowance degree, it is easy to realize turning while maintaining a driving allowance degree. Specifically, the tight turn control may be ended or execution of the tight turn control may be prevented when the driving allowance degree is equal to or less than a predetermined value. Furthermore, an allowable traveling state in the tight turn control may be set according to a change in driving allowance degree. Specifically, during execution of the tight turn control, a behavior state (for example, a vehicle speed, a suspension extension/contraction amount, output, or a difference in rotational speed between inner and outer wheels) of the vehicle may be limited so that the driving allowance degree is prevented from becoming less than a predetermined value. For example, as the driving allowance degree becomes larger, an upper limit on the vehicle speed, acceleration, output, turning radius, a difference in rotational speed between the inner and outer wheels, or suspension extension/contraction amount is set larger.

(21) In a case where the cancellation condition is set based on a wheel control actuator (a braking device or a driving motor), the tight turn control can be ended according to a situation of the actuator. Specifically, the tight turn control may be ended when it is determined that the actuator has exceeded an operation allowance value or when it is determined that the actuator is in an abnormal state.

(22) The control device 4 may set an upper limit on a difference in rotational speed between the inner and outer wheels according to traveling behavior or a temporal change in traveling behavior. The upper limit on the difference in rotational speed may be set smaller as any of a vehicle speed, acceleration, output, and a reciprocal of a turning radius as the traveling behavior becomes larger. This can prevent the cancellation condition from being reached during the tight turn control, thereby making it easy to continue the tight turn control.

(23) The control device 4 may perform the tight turn control in a manner that varies depending on a power transmission state. Specifically, in a four-wheel drive state, the difference in rotational speed between the right and left wheels may be kept smaller than that in a two-wheel drive state. This can suppress a variation in turning angle during the tight turn control between the two-wheel drive state and the four-wheel drive state. In a case where a state before the tight turn control is a differential lock state, the differential lock state may be cancelled to return to a differential state and a difference in rotational speed between the left and right wheels may be generated. In a case where one of axles in the front-rear direction is in a differential lock state, a wheel to be braked may be selected so that a difference in rotational speed is generated between left and right wheels of the other axle in the front-rear direction that is maintained in a differential state.

(24) The notification device 52 may not only notify the driver that the tight turn control is being performed, but also notify the driver in another form about being in a standby state until an instruction to perform the tight turn control is given to shift to the tight turn control. This allows the driver to grasp that there is a possibility of shifting to the tight turn control, thereby allowing the driver to prepare for the tight turn control. In a case where the execution condition is not satisfied in a state where an instruction to perform the tight turn control has been given, the notification device 52 may notify the driver in a form different from the tight turn control about being in a non-start state indicating that the tight turn control is not started. Furthermore, in a case where the cancellation condition is satisfied, the notification device 52 may notify the driver in another form about being in a cancellation state in which the tight turn control is cancelled. In this way, the driver is notified about control states in different forms and thereby can grasp a state of the control device, and therefore convenience can be improved. Furthermore, in a case where the execution condition is not satisfied or in a case where the cancellation condition is satisfied, the driver may be notified about a cause for this. This allows the driver to grasp the reason why the tight turn control cannot be executed, and convenience can be further improved.

(25) During the tight turn control, in a case where a wheel for which a difference in rotational speed is generated is locked, it is possible to realize an operation of changing a direction of the vehicle as compared with a case where the wheel is not locked but braked. During the tight turn control, in a case where a wheel for which a difference in rotational speed is generated is not locked but braked, a wear amount of a grounded surface of the braked wheel can be kept smaller than that in a case where the wheel is locked.

(26) As described above, in a case where a difference in rotational speed between inner and outer wheels is varied depending on traveling behavior during the tight turn control, a turn according to the traveling behavior can be made, and a tight turn can be executed even in a case where a situation change width is large like traveling on uneven ground. Furthermore, in a case where other traveling behavior (a vehicle speed, an acceleration, output, or the like) is controlled together with the difference in rotation speed during the tight turn control, a tight turn can be executed even in a case where a situation change width is large like traveling on uneven ground. In a case where the suspension extension/contraction amount is adjustable, a stroke of a wheel to be braked during the tight turn control may be extended relative to the other wheels. This can make turning about the braked wheel easy. Alternatively, strokes of the wheels other than the wheel to be braked may be contracted. This can also produce a similar effect.

Second Embodiment

Figure 6:
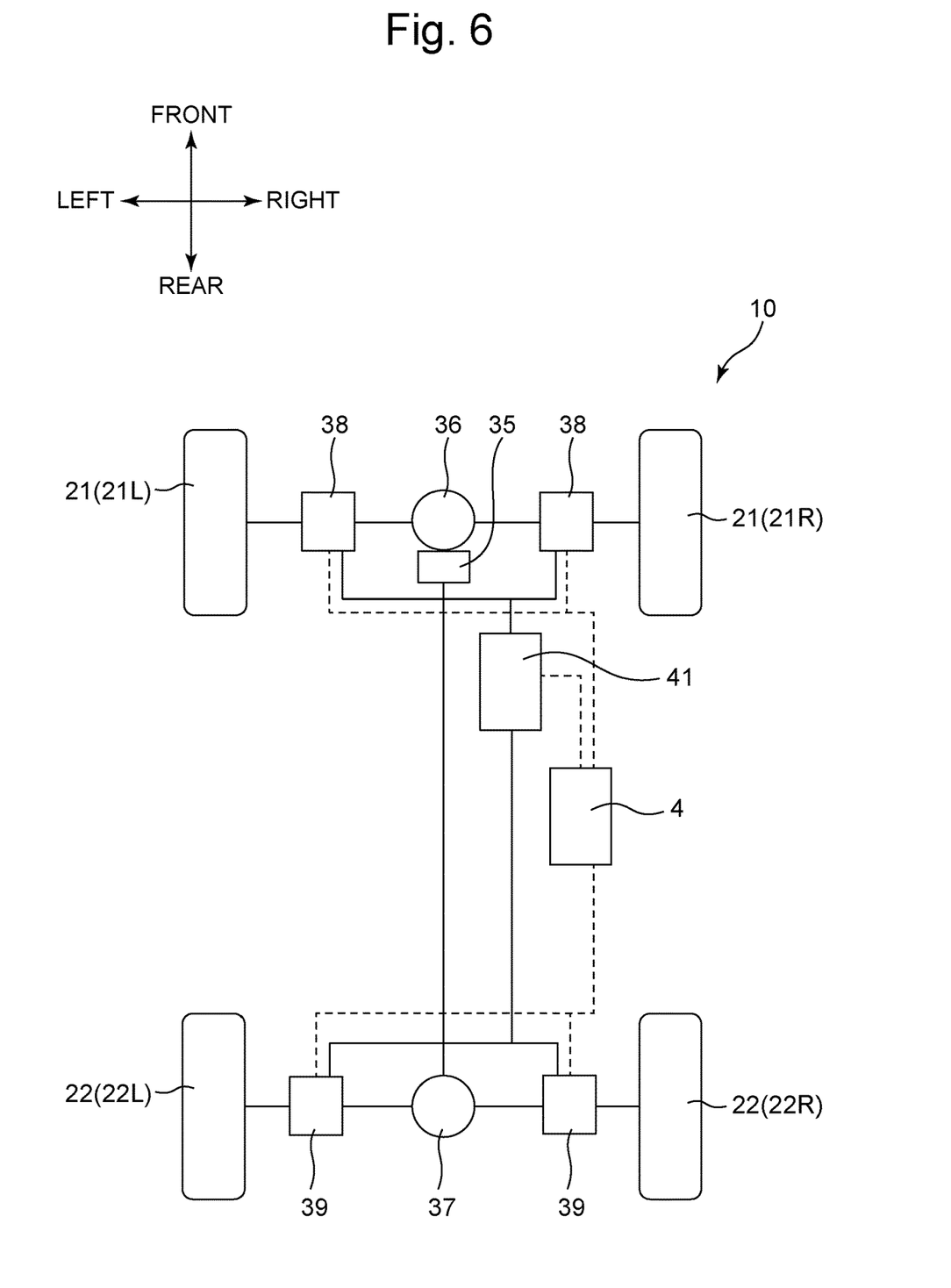
FIG. 6 is a schematic configuration diagram of a utility vehicle including an electric motor.

Although an aspect in which the present invention is applied to a utility vehicle including an engine has been described in the first embodiment, the present invention is also applicable to a utility vehicle including an electric motor. FIG. 6 is a schematic configuration diagram of a utility vehicle 10 including an electric motor according to a second embodiment. The second embodiment is different from the first embodiment in that a power source 41 for traveling drive and electric motors 38 and 39 are provided instead of an engine and is similar to the first embodiment except for this. Therefore, in the description of the second embodiment, constituent elements similar to those in the first embodiment are given identical reference signs, and detailed description thereof will be omitted.

As illustrated in FIG. 6, the utility vehicle 10 includes electric motors 38 and 39 which are drive sources for driving wheels 21 and 22, a power source 41 for supplying electric power to the electric motors 38 and 39, and a control device (ECU) 4 for controlling the wheels 21 and 22 and the electric motors 38 and 39.

The utility vehicle 10 according to the present embodiment has tight turn control (small turning radius turning mode) for improving at least turning performance of the utility vehicle 10 in addition to a mode for normal traveling, and can travel while switching between the modes as necessary. In the tight turn control, the control device 4 performs wheel control so that a rotational speed of an outer wheel becomes relatively higher than a rotational speed of an inner wheel in a turning direction of the utility vehicle 10. Specifically, the control device 4 performs wheel control so that a rotational speed of an outer wheel becomes relatively higher than a rotational speed of an inner wheel by controlling rotational speeds of the electric motors 39. When the utility vehicle 10 turns left, the outer wheels correspond to the right wheels 21R and 22R, and the inner wheels correspond to the left wheels 21L and 22L. When the utility vehicle 10 turns right, the outer wheels correspond to the left wheels 21L and 22L, and the inner wheels correspond to the right wheels 21R and 22R. During the tight turn control, the control device 4 controls the wheels 22 on the rear side in the traveling direction of the utility vehicle 10 (wheels different from the front wheels 21 serving as steered wheels) so that a rotational speed of the inner wheel 22L becomes lower than a rotational speed of the outer wheel 22R in the turning direction of the utility vehicle 10. By executing the tight turn control, a turning radius of turning during the tight turn control can be made smaller than a turning radius of turning during normal traveling of a conventional utility vehicle.

In brake control, a regenerative brake may be used to store a decrease in the rotational speed of the wheel 22 as electric power.

According to the utility vehicle 10 having the above configuration, the drive source includes the electric motors 38 and 39 for individually driving the wheels 21 and 22, respectively, and therefore a rotational speed of an outer wheel can be made relatively higher than a rotational speed of an inner wheel by increasing or decreasing the rotational speeds of the motors that rotate the wheels 21 and 22. More specifically, the difference in rotational speed between the inner and outer wheels may be realized by increasing the rotational speed of the outer wheel or the difference in rotational speed between the inner and outer wheels may be realized by decreasing the rotational speed of the inner wheel. The effect can be enhanced by increasing the rotational speed of the outer wheel and decreasing the rotational speed of the inner wheel.

Although the utility vehicle 10 is a four-wheeled vehicle in the above embodiment, the present invention is not limited to a four-wheeled utility vehicle, and for example, the present invention can be applied to any vehicle having a pair of left and right wheels somewhere, such as a tricycle, and the present invention can be more suitably applied to a utility vehicle. A seat 28 of the utility vehicle 10 according to the present embodiment is a single-row seat as illustrated in FIG. 1, but the present invention is also applicable to vehicles having various seat structures such as a vehicle having two-row seats and is not limited to other detailed configurations according to the present embodiment.

Although the utility vehicle 10 is four-wheel drive in the present embodiment, the present invention is also applicable to a front wheel drive vehicle and a rear wheel drive vehicle. More specifically, the present invention is applicable not only to a front wheel steering/rear wheel driving type vehicle but also to a front wheel steering/front wheel driving type vehicle and a front and rear wheel steering type vehicle. The utility vehicle 10 may be automatically driven.

Although the first embodiment is an aspect in which the present invention is applied to a utility vehicle including an engine and the second embodiment is an aspect in which the present invention is applied to a utility vehicle including an electric motor, the present invention is also applicable to a utility vehicle including both the first embodiment and the second embodiment. The drive source may be either an engine or an electric motor or may be a hybrid type that is a combination of an engine and an electric motor. Furthermore, a drive source may be individually provided in addition to the engine and the electric motor.

Various modifications and changes can be made without departing from the spirit and scope of the present invention described in the claims.

What is claimed is:

1. A utility vehicle comprising:
   a pair of left and right wheels;
   a drive source configured to drive the pair of left and right wheels; and
   a control device configured to individually control rotational speeds of the wheels,
   wherein the control device is further configured to:
      determine whether a predetermined tight turn execution condition has been satisfied, and
      when the predetermined tight turn execution condition has been satisfied, execute tight turn control to actively control a rotational speed of the pair of left and right wheels so that a rotational speed of an outer one of the pair of left and right wheels is higher than a rotational speed of an inner one of the pair of left and right wheels with respect to a turning direction of the utility vehicle by controlling an electronically controlled brake system, and wherein the control device is further configured to end the tight turn control when the utility vehicle satisfies a predetermined cancellation condition including a mode switching command given by a driver.

2. The utility vehicle according to claim 1, further comprising an actuator configured to produce differences in rotational speeds of the pair of left and right wheels, wherein the control device is configured to control the rotational speeds of the pair of left and right wheels by controlling the actuator.

3. The utility vehicle according to claim 2, wherein the actuator is one of a motor, a clutch, or a brake.

4. The utility vehicle according to claim 1, wherein the cancellation condition is set based on a state of an actuator that controls wheel control of the control device.

5. The utility vehicle according to claim 1, further comprising a vehicle control device configured to control a behavior state of the vehicle so that a predetermined driving allowance degree is prevented from becoming less than a predetermined value during execution of the tight turn control.

6. The utility vehicle according to claim 1, further comprising a traveling behavior sensor configured to detect a traveling behavior, and an actuator configured to produce differences in rotational speeds of the pair of left and right wheels, wherein the control device is configured to control the pair of left and right wheels by controlling the actuator, and to control the pair of left and right wheels based on a detection value of the traveling behavior sensor so that the rotational speed of the outer one of the pair of left and right wheels becomes relatively higher than the rotational speed of the inner one of the pair of left and right wheels.

7. The utility vehicle according to claim 1, further comprising a switching device configured to switch a plurality of types of power transmission modes from the drive source to the wheels, wherein the control device executes the tight turn control in accordance with a power transmission mode selected by the switching device.

8. The utility vehicle according to claim 1, wherein the control device is configured to perform the tight turn control by individually performing brake control on the pair of left and right wheels.

9. The utility vehicle according to claim 1, wherein the control device is configured to perform the tight turn control by controlling driving of a drive source that individually drives the pair of left and right wheels.

10. The utility vehicle according to claim 1, wherein the pair of left and right wheels are a pair of rear left and right wheels, and the control device is configured to, during the tight turn control, control rotational speeds of the pair of rear left and right wheels with respect to a traveling direction of the utility vehicle.

11. The utility vehicle according to claim 1, wherein:
the pair of left and right wheels include a steered wheel that changes a relative direction with respect to a vehicle body in accordance with a traveling direction change command from a driver during traveling, and the control device is configured to control a second pair of wheels not including the steered wheel so that a rotational speed of an outer wheel of the second pair of wheels is higher than a rotational speed of an inner wheel of the second pair of wheels.

12. The utility vehicle according to claim 1, further comprising a notification device configured to notify a driver that the utility vehicle is executing the tight turn control, wherein the control device is configured to activate the notification device when the utility vehicle is executing the tight turn control.

13. The utility vehicle according to claim 1, wherein the utility vehicle has a roll cage frame structure.

14. The utility vehicle according to claim 1, further comprising a speed sensor configured to measure a speed of a utility vehicle body, wherein the control device is configured to maintain a vehicle speed measured by the speed sensor at or below a predetermined speed when executing the tight turn control.

15. The utility vehicle according to claim 1, further comprising:
a respective braking system for each of the pair of left and right wheels;
a gear sensor configured to determine a rotation direction of drive gears configured to drive the utility vehicle; and
a steering angle sensor configured to determine a steering angle of a steering wheel,
wherein the control device is further configured to brake one of the pair of left and right wheels using the respective braking system for the one of the pair of left and right wheels based on (i) a traveling direction determined from the rotation direction of the drive gears determined by the gear sensor and (ii) the steering angle of the steering wheel determined by the steering angle sensor.

16. The utility vehicle according to claim 1, further comprising at least one of:
a throttle opening degree sensor configured to determine an opening degree of a throttle;
a vehicle speed sensor configured to determine whether a speed of the utility vehicle is at or above a predetermined speed; and
a steering angle sensor configured to determine a steering angle of a steering wheel,
wherein the control device is further configured to cancel the tight turn control based on at least one of (i) a signal from the throttle opening degree sensor indicating an increase in the opening degree of the throttle causing an acceleration of the utility vehicle, (ii) a signal from the vehicle speed sensor indicating the speed of the utility vehicle is above the predetermined speed, and (iii) the steering angle determined by the steering angle sensor.

17. A utility vehicle comprising:
a pair of left and right wheels;
a drive source configured to drive the pair of left and right wheels;
a control device configured to individually control rotational speeds of the wheels; and
a tight turn instruction operator configured to transmit an instruction from a driver to execute a tight turn control, the tight turn instruction operator being separate from a steering mechanism for the utility vehicle,
wherein the control device is further configured to:
determine whether a predetermined tight turn execution condition has been satisfied, when the predetermined tight turn execution condition has been satisfied, execute the tight turn control to actively control a rotational speed of the pair of left and right wheels so that a rotational speed of an outer one of the pair of left and right wheels is higher than a rotational speed of an inner one of the pair of left and right wheels with respect to a turning direction of the utility vehicle by controlling an electronically controlled brake system, determine whether or not to execute the tight turn control based on the tight turn execution condition when the instruction to execute the tight turn control is transmitted by the tight turn instruction operator, and end the tight turn control when the utility vehicle satisfies a predetermined cancellation condition including a mode switching command given by a driver.

18. A utility vehicle comprising:

a pair of left and right wheels;

a drive source configured to drive the pair of left and right wheels; and a control device configured to individually control rotational speeds of the wheels, wherein the control device is further configured to:
  determine whether a predetermined tight turn execution condition has been satisfied, and
  when the predetermined tight turn execution condition has been satisfied, execute tight turn control to actively control a rotational speed of the pair of left and right wheels so that a rotational speed of an outer one of the pair of left and right wheels is higher than a rotational speed of an inner one of the pair of left and right wheels with respect to a turning direction of the utility vehicle, and wherein the control device is further configured to end the tight turn control when the utility vehicle satisfies a predetermined cancellation condition including a mode switching command given by a driver, and wherein the cancellation condition is set based on at least one of: (i) a position of a center of gravity in the vertical direction, (ii) a centrifugal force applied to a vehicle body during turning, (iii) an inclination of a traveling surface during traveling, and (iv) a resistance force against a posture change of the vehicle body about the central axis extending in a front-rear direction.

* * * * *